(12) United States Patent
Tadlock

(10) Patent No.: US 7,981,289 B2
(45) Date of Patent: Jul. 19, 2011

(54) MODULAR FLUID TREATMENT APPARATUS AND METHOD

(75) Inventor: John W. Tadlock, West Chicago, IL (US)

(73) Assignee: Everpure, LLC, Hanover Park, IL (US)

(*) Notice: Subject to any disclaimer, the term of this patent is extended or adjusted under 35 U.S.C. 154(b) by 377 days.

(21) Appl. No.: 11/985,049

(22) Filed: Nov. 13, 2007

(65) Prior Publication Data
US 2008/0135501 A1    Jun. 12, 2008

Related U.S. Application Data

(63) Continuation of application No. 10/649,334, filed on Aug. 27, 2003, now Pat. No. 7,294,262.

(51) Int. Cl.
*B01D 35/30* (2006.01)
*B01D 27/00* (2006.01)
*B01D 27/08* (2006.01)

(52) U.S. Cl. ..... 210/232; 210/240; 210/348; 210/433.1; 210/437; 210/443; 210/444

(58) Field of Classification Search ............... 210/232, 210/240, 323.1, 323.2, 335, 348, 433.1, 437, 210/443, 444
See application file for complete search history.

(56) References Cited

U.S. PATENT DOCUMENTS

| | | | | |
|---|---|---|---|---|
| 3,684,100 A * | 8/1972 | Close | | 210/444 |
| 3,914,176 A * | 10/1975 | Holmes | | 210/132 |
| 4,693,820 A * | 9/1987 | Baxter | | 210/232 |
| 5,336,406 A * | 8/1994 | Stanford et al. | | 210/235 |
| 5,407,571 A * | 4/1995 | Rothwell | | 210/232 |
| 5,919,362 A * | 7/1999 | Barnes et al. | | 210/232 |
| 7,628,280 B2 * | 12/2009 | Mandt et al. | | 210/444 |

* cited by examiner

*Primary Examiner* — John Kim
(74) *Attorney, Agent, or Firm* — Quarles & Brady, LLP

(57) ABSTRACT

Some embodiments of the present invention provide a modular fluid treatment assembly and method in which modules of the system each have a head that can be connected to one or more heads (of one or more other modules) in different configurations. In some embodiments, the relationship between a cartridge of the module and its corresponding head prevents fluid from entering between the cartridge and an external shell of the module. Also, some embodiments provide a module having a head with substantially concentric inlet and outlet ports in fluid communication with a cartridge coupled to the head.

7 Claims, 10 Drawing Sheets

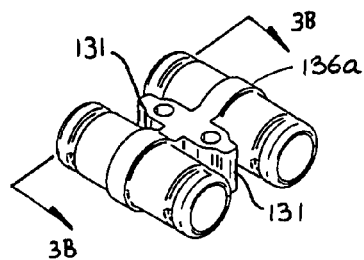
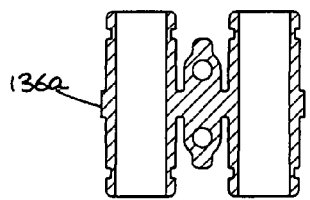
*FIG. 3A*  *FIG. 3B*
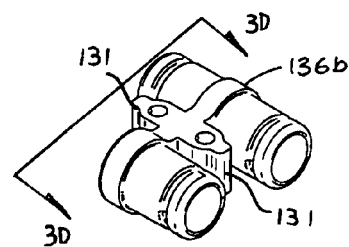
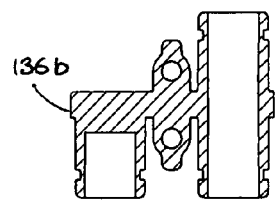
*FIG. 3C*  *FIG. 3D*
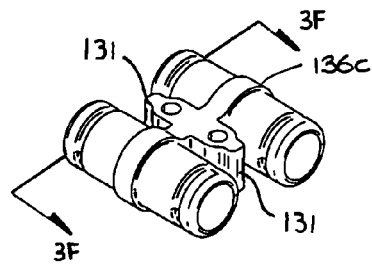
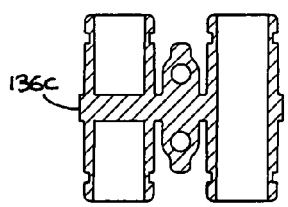
*FIG. 3E*  *FIG. 3F*
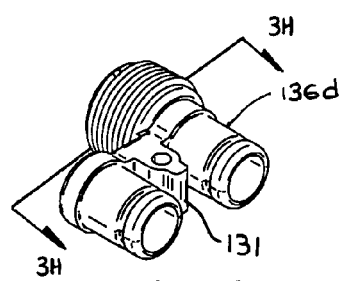
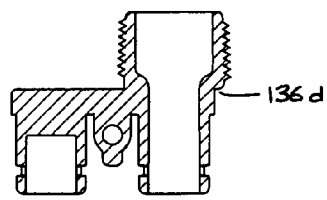
*FIG. 3G*  *FIG. 3H*
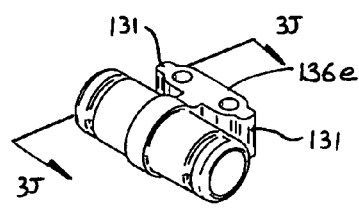
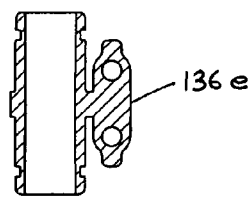
*FIG. 3I*  *FIG. 3J*

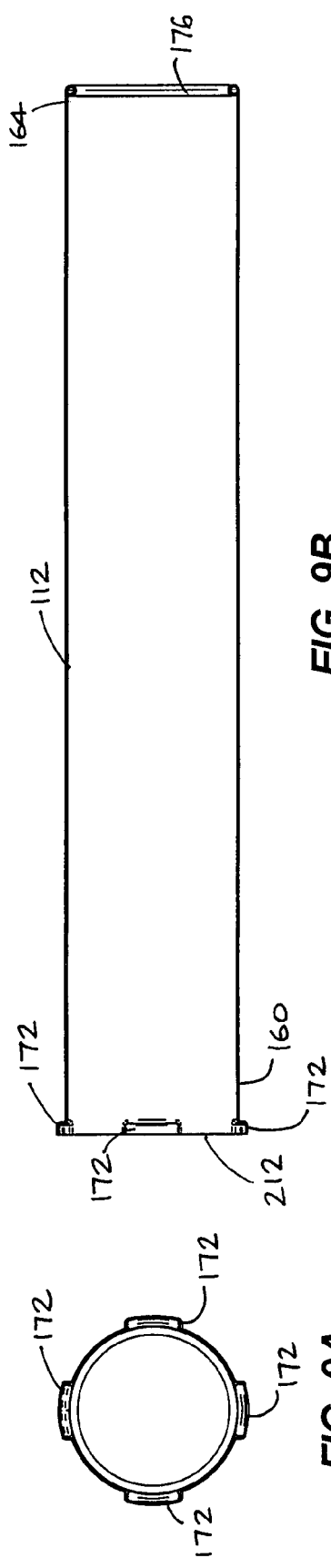
FIG. 9A
FIG. 9B
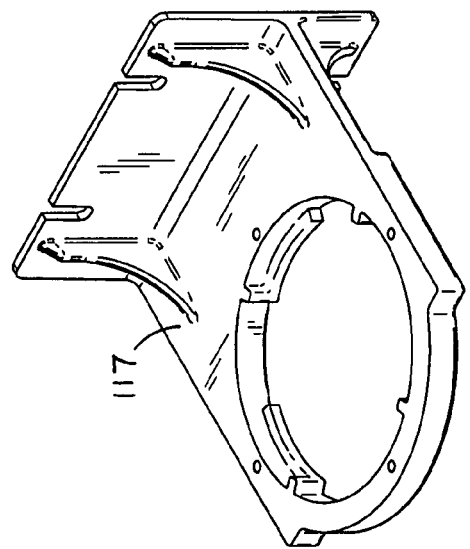
FIG. 9D
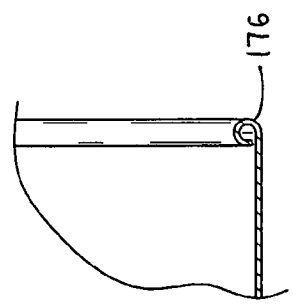
FIG. 9C

MODULAR FLUID TREATMENT APPARATUS AND METHOD

RELATED APPLICATIONS

This application is a continuation of U.S. patent application Ser. No. 10/649,334, filed Aug. 27, 2003, now U.S. Pat. No. 7,294,262, the entire contents of which are incorporated herein by reference.

BACKGROUND OF THE INVENTION

Removing and replacing filters in a fluid treatment system are generally time consuming and labor intensive tasks. For example, tools are often employed to remove an existing filter from the fluid treatment system. In some cases, a filtration specialist must be called to perform work on a filter system, such as to disassemble the filter system, clean the system, and replace system components (such as filters). The filter removal and replacement process often requires significantly more attention and work when the filtration system uses different types of filters for filtering different substances from the fluid or the fluids. Additionally, systems that include a plurality of filtering phases typically require special setup and connection between different filtering components. For example, in a system where a fluid is treated by three different system components, the connections between the system components are often difficult to establish and/or release. Consequently, time and cost become significant factors in assembling, re-configuring, repairing, and maintaining such systems. As a result, a system that eases the removal and replacement process of system components, that requires low maintenance, and that is cost effective would be welcomed by users of such a system.

SUMMARY OF THE INVENTION

Some embodiments of the present invention provide a fluid treatment assembly comprising a head having a fluid inlet configured to receive fluid into the assembly, and a fluid outlet through which fluid exits the assembly; a shell releasably coupled to the head and having a shell interior; and a cartridge removably received within the shell and releasably coupled to the head, the cartridge having a cartridge wall separating an interior of the cartridge from an exterior of the cartridge, the cartridge wall having substantially uniform properties along the cartridge and between opposite ends of the cartridge and deformable under internal fluid pressure to radially expand against the shell; a cartridge inlet configured to receive fluid from the head; a cartridge outlet through which fluid exits the cartridge to the head; and an internal chamber through which fluid passes from the cartridge inlet to the cartridge outlet, the cartridge configured to retain fluid within the internal chamber and the head and to fluidly isolate the shell interior and the cartridge exterior from fluid passing through the fluid treatment assembly; a first seal between at least one wall of the cartridge defining the cartridge inlet and at least one wall of the head, the first seal separate from the shell and positioned to block fluid from passing the first seal; and a second seal between the at least one wall of the cartridge defining the cartridge outlet and at least one wall of the head, the second seal separate from the shell and positioned to block fluid from passing the second seal.

In some embodiments a method of treating a fluid is provided, and comprises receiving a disposable fluid treatment cartridge in a shell, wherein the disposable fluid treatment cartridge having an interior, an exterior, and a length extending from and between opposite ends of the disposable fluid treatment cartridge; providing a head through which fluid passes into and out of the disposable fluid treatment cartridge; coupling a first seal to one of the head and the disposable fluid treatment cartridge; coupling a second seal to one of the head and the disposable fluid treatment cartridge; coupling the shell and the disposable fluid treatment cartridge to the head; closing a gap between at least one wall of the disposable fluid treatment cartridge defining a fluid inlet of the disposable fluid treatment cartridge and a wall of the head with a first seal; closing a gap between at least one wall of the disposable fluid treatment cartridge defining a fluid outlet of the disposable fluid treatment cartridge and a wall of the head with a second seal; preventing fluid from entering between the disposable fluid treatment cartridge and the shell by fluidly isolating the interior of the disposable fluid treatment cartridge from the exterior of the disposable fluid treatment cartridge with at least one of the first and second seals; and radially expanding the disposable fluid treatment cartridge substantially uniformly along at least a majority of the length of the disposable fluid treatment cartridge and against the shell.

In another aspect of the present invention, a modular fluid treatment system is provided, and comprises: a first fluid treatment module having a first head; and first, second, and third fluid ports on the first head, each of the fluid ports on the first head providing connection locations to which the first head can be connected to at least one other fluid treatment module; a second fluid treatment module having a second head; and a first port on the second head; the first head having a first orientation with respect to the second head in which the first fluid port of the first head is in a first connection location and in which the second fluid port is in a second connection location; and a second orientation with respect to the second head in which the third fluid port of the first head is in the first connection location and in which the second fluid port is in a third connection location.

Some embodiments of the present invention provide a method of assembling a fluid treatment system having first and second fluid treatment modules each having a head with at least two fluid ports, wherein the method comprises: selecting one of two different orientations of the head of the first fluid treatment module with respect to the second fluid treatment module, the first and second fluid treatment modules connectable with each other in both of the two different orientations to define two different configurations of the first and second fluid treatment modules, each configuration having at least one fluid path through the first and second fluid treatment modules; drawing the heads of the first and second fluid treatment modules together in the orientation selected; and connecting ports of the heads of the first and second fluid treatment modules together to establish fluid communication between the first and second fluid treatment modules, wherein first and second ports of the head of the first fluid treatment module are connected to first and second ports of the head of the second fluid treatment module in a first configuration of the first and second fluid treatment modules, and wherein third and fourth ports of the head of the first fluid treatment module are connected to the first and second ports of the head of the second fluid treatment module in a second configuration of the first and second fluid treatment modules.

In some embodiments, a fluid treatment apparatus is provided, and comprises: a head; a fluid treatment cartridge sealingly and releasably connected to the head, the fluid treatment cartridge having an inlet and an outlet substantially concentrically positioned with respect to one another; a first fluid line extending through the head and in fluid communication with the inlet of the fluid treatment cartridge, the first fluid line permitting fluid to bypass the fluid treatment cartridge in at least one configuration of the first head; and a second fluid line extending through the head and in fluid communication with the outlet of the fluid treatment cartridge.

In yet another aspect of the present invention, a method of treating fluid in a modular fluid treatment apparatus is provided, and comprises: receiving fluid in an inlet port of a head; receiving fluid from the inlet port of the head at an inlet of a fluid treatment cartridge releasably coupled to the head; moving fluid through an outlet of the fluid treatment cartridge substantially concentric with respect to the inlet of the fluid treatment cartridge and into a second inlet of the head; moving fluid from the second inlet of the head through a first outlet port of the head; and moving fluid from the inlet port of the head, past the inlet of the fluid treatment cartridge, and to a second outlet port of the head while receiving fluid from the inlet port of the head at the inlet of the fluid treatment cartridge and while moving fluid through the first outlet of the fluid treatment cartridge.

Other features and advantages of the invention will become apparent to those skilled in the art upon review of the following detailed description, claims, and drawings.

BRIEF DESCRIPTION OF THE DRAWINGS

The present invention is further described with reference to the accompanying drawings, which show an exemplary embodiment of the present invention. However, it should be noted that the invention as disclosed in the accompanying drawings is illustrated by way of example only. The various elements and combinations of elements described below and illustrated in the drawings can be arranged and organized differently to result in embodiments which are still within the spirit and scope of the present invention.

In the drawings, wherein like reference numerals indicate like parts:

FIG. 3A is a perspective view of a connector according to an embodiment of the present invention;

FIG. 3B is a cross-sectional view of the connector illustrated in FIG. 3A, taken along lines 3B-3B of FIG. 3A;

FIG. 3C is a perspective view of another connector according to an embodiment of the present invention;

FIG. 3D is a cross-sectional view of the connector illustrated in FIG. 3B, taken along lines 3D-3D of FIG. 3C;

FIG. 3E is a perspective view of another connector according to an embodiment of the present invention;

FIG. 3F is a cross-sectional view of the connector illustrated in FIG. 3E, taken along lines 3F-3F of FIG. 3E;

FIG. 3G is a perspective view of another connector according to an embodiment of the present invention;

FIG. 3H is a cross-sectional view of the connector illustrated in FIG. 3G, taken along lines 3H-3H of FIG. 3G;

FIG. 3I is a perspective view of another connector according to an embodiment of the present invention;

FIG. 3J is a cross-sectional view of the connector illustrated in FIG. 3I, taken along lines 3J-3J of FIG. 3I;

FIG. 9A is an end view of the shell illustrated in FIG. 7;

FIG. 9B is a cross-sectional view of the shell illustrated in FIG. 7, taken along lines 9-9 of FIG. 7;

FIG. 9C is a detail view of the shell illustrated in FIG. 9B;

FIG. 9D is a perspective view of a bracket employed in the system illustrated in FIGS. 1-6;

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and variations thereof herein are used broadly and encompass direct and indirect connections and couplings. In addition, the terms "connected" and "coupled" and variations thereof are not restricted to physical or mechanical connections or couplings.

DETAILED DESCRIPTION

Figure 1A:
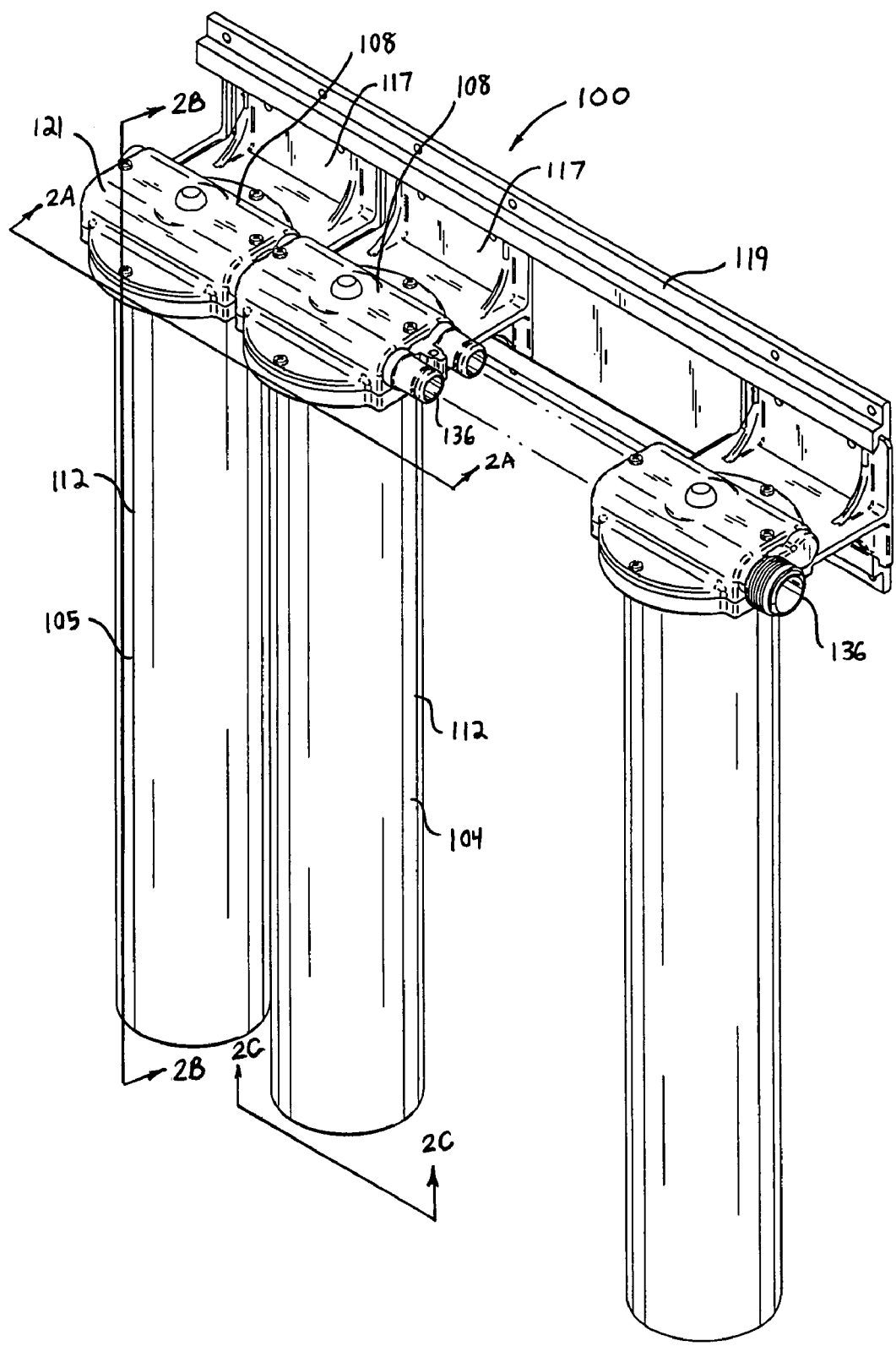
FIG. 1A is a partially exploded view of a modular fluid treatment system according to an embodiment of the present invention.
Figure 1B:
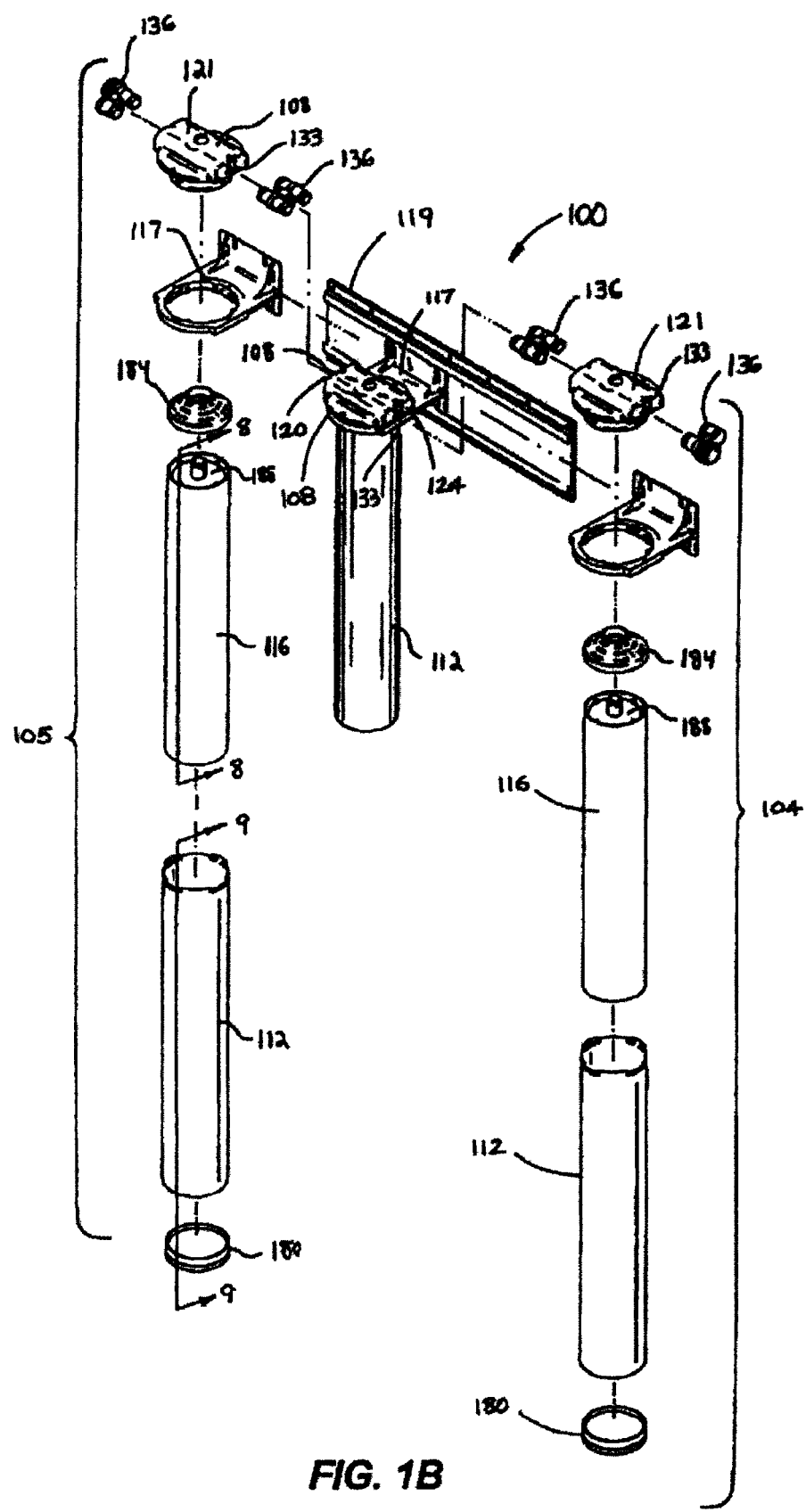
FIG. 1B is another partially exploded view of the modular fluid treatment system illustrated in FIG. 1A.

FIGS. 1 and 2 illustrate a fluid treatment system (indicated generally at 100) that includes three fluid treatment modules or assemblies 104, 105. Each illustrated exemplary module 104, 105 includes a head 108, a shell 112, and a cartridge 116. Each module 104, 105 is mounted to a wall or other surface via a bracket 117. The brackets 117 can be any shape desired, and can be connected to their respective assemblies 104, 105 in any suitable manner. By way of example only, the brackets 117 in the illustrated embodiment each have an aperture within which a respective module 104, 105 is received as will be described in greater detail below. Accordingly, each such bracket 117 surrounds a respective module 104, 105. In other embodiments, the bracket 117 can be secured to the module 104, 105 by being received within a recess defined by the bracket (e.g., a U-shaped recess cradling any part of the module 104, 105) one or more fasteners extending through aligned apertures in the bracket 117 and the head 108 or shell 112, inter-engaging elements on the bracket 117 and on the head 108 or shell 112 (e.g., a tongue and groove module, a pin and recess module, and the like), by being integrally formed with the module 104, 105, and the like. Still other manners of connecting the assemblies 104, 105 to the brackets 117 are possible and fall within the spirit and scope of the present invention. In still other embodiments, the assemblies 104, 105 are mounted to a surface without the use of brackets 117. For example, each head 108 can be directly secured to a surface by one or more fasteners, adhesive or cohesive bonding material, inter-engaging elements on the module 104, 105 and surface, and the like.

The brackets 117 (if employed) can be secured to a surface in any suitable manner, such as those just described with reference to direct connection of the assemblies 104, 105 to a surface. In some cases, it is desirable to adjustably mount the assemblies 104, 105 so that one or more of the assemblies 104, 105 is movable to different locations with respect to the surface. By way of example only, the brackets 117 in the illustrated embodiment are mounted to a rail 119, permitting the brackets 117 to be positioned as desired along the rail 119 (e.g., in a range of positions along the rail 119). For this purpose, the brackets 117 can have flanges, edges, tabs, or other features that engage with grooves, lips, or other elements along the rail 119 to permit sliding engagement between the brackets 117 and rail 119. One having ordinary skill in the art will appreciate that other types of engagement between the brackets 117 and a rail 119 are possible, such as magnetic engagement, pins engagable with multiple apertures along the rail 119 (and vice versa), an aperture in each bracket 117 receiving a lip or other feature of the rail 119 in sliding engagement, and the like.

In some embodiments, the rail 119 (or other structure to which the assemblies 104, 105 are mounted) can be employed to support other components of a fluid treatment system 100. By way of example only, the rail 119 in the illustrated exemplary embodiment can support one or more flowmeters, pressure regulators, and other fluid sensor and monitoring devices, chemical feeders, water softeners, pumps, valves and valve assemblies, filters, accumulators, fluid carbonation devices, distillers, cooling and refrigeration system components, heaters, ultraviolet sterilizers, ozonators, and other fluid elements and devices used to move, store, and treat fluid.

The assemblies 104, 105 in the illustrated exemplary embodiment are shown mounted in a substantially vertical orientation (i.e., elongated in a vertical direction). However, it should be noted that the assemblies 104, 105 can be secured to any surface in any orientation desired.

While the system of FIG. 1 shows two connected assemblies 104, 105, either module 104, 105 can be employed as a stand-alone system or in conjunction with any number of other assemblies 104, 105 in other fashions as will be described in greater detail below. The discussion herein regarding a two-module system 100 is provided by way of example only, and in order to convey elements, features, and capabilities of the assemblies 104, 105 and possible systems that can be defined by the assemblies 104, 105.

Figure 2A:
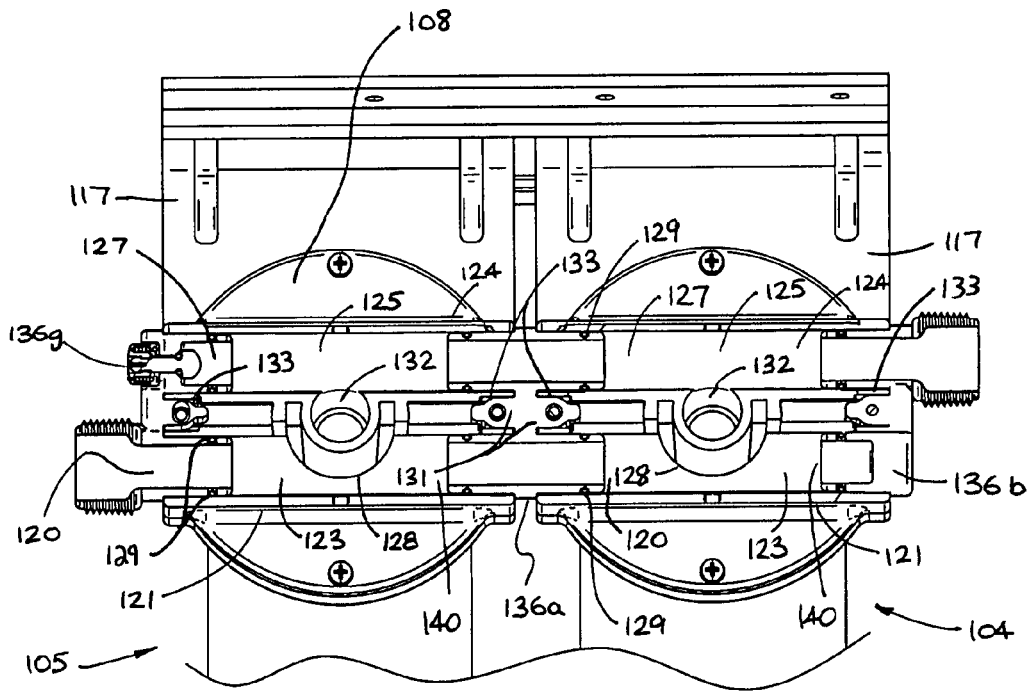
FIG. 2A is a perspective cross-sectional view of part of the modular fluid treatment system illustrated in FIGS. 1A and 1B, taken along lines 2A-2A of FIG. 1A.
Figure 4:
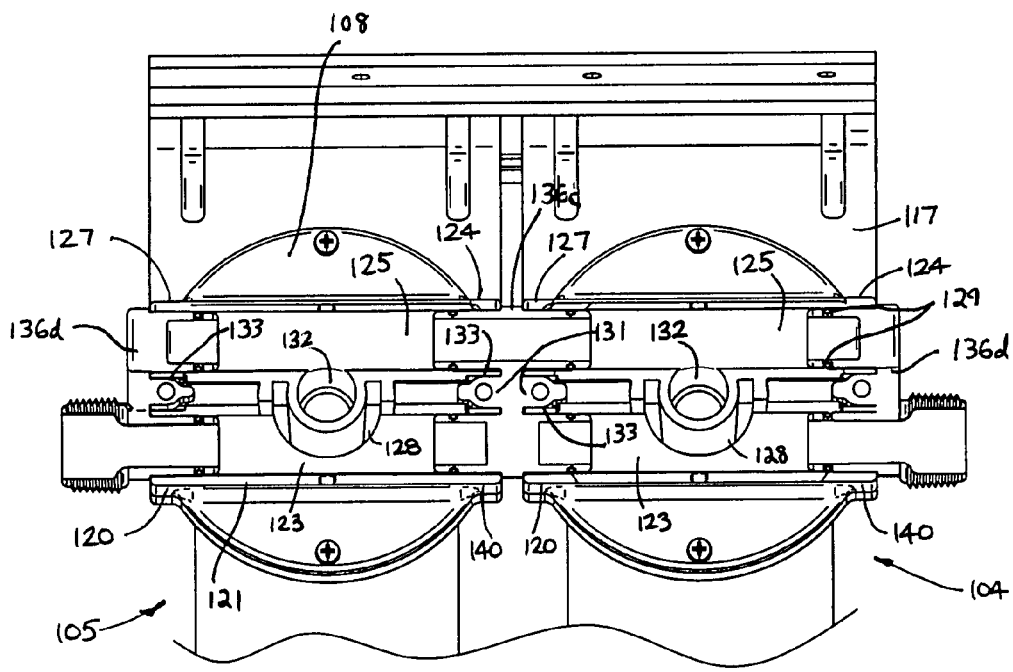
FIG. 4 is a perspective cross-sectional view of part of the modular fluid treatment system illustrated in FIGS. 1A and 1B, shown in another arrangement.
Figure 5:
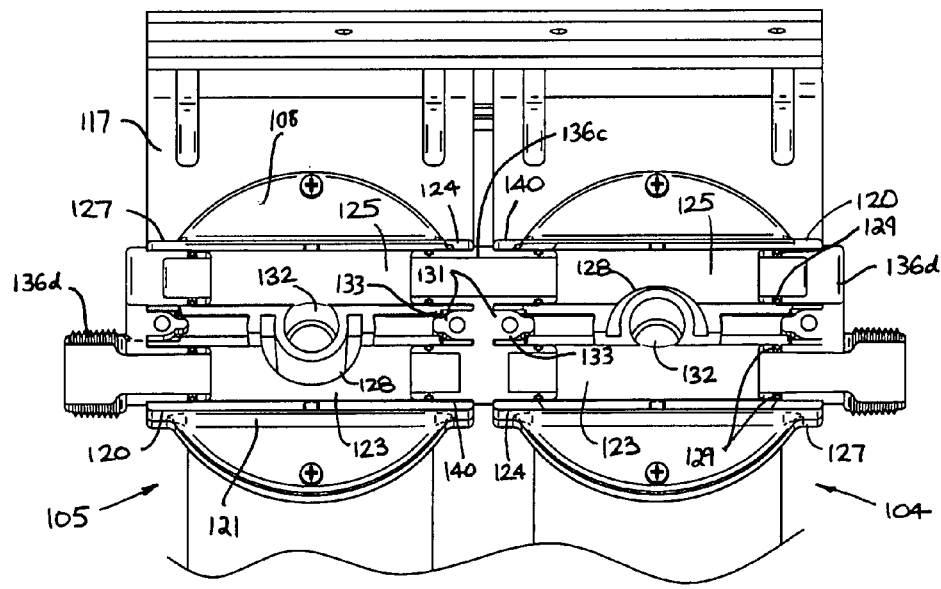
FIG. 5 is a perspective cross-sectional view of part of the modular fluid treatment system illustrated in FIGS. 1A and 1B, shown in another arrangement.

Although the head 108 can have a number of different configurations, the head 108 of each module 104, 105 in the illustrated exemplary embodiment has a body 121 through which run two fluid lines 123, 125 (see FIGS. 2, 4, and 5). Each fluid line 123, 125 defines first and second fluid ports (fluid ports 120, 140 for fluid line 123 and fluid ports 127, 124 for fluid line 125 in the illustrated exemplary embodiment). Depending upon the direction of flow of fluid through the module and the manner in which the assemblies 104, 105 are connected and assembled as will be discussed in greater detail below, any of the fluid ports 120, 140, 127, 124 of the fluid lines 123, 125 can define fluid inlets or fluid outlets of the assemblies 104, 105. For example, in the system configuration illustrated in FIG. 2A, fluid flow is generally to the right through the assemblies 104, 105. Accordingly, either or both fluid ports 120, 127 could be employed as fluid inlets of the assemblies 104, 105, while either or both fluid ports 124, 140 could be employed as fluid outlets of the assemblies 104, 105. In the particular arrangement illustrated in FIG. 2A where fluid flows to the right through the assemblies 104, 105, the first module 104 has one fluid inlet 120 (fluid port 127 is plugged) and two fluid outlets 124, 140. Also, because fluid port 140 of the second module 105 is plugged, the second module 105 has two fluid inlets 120, 127 and one fluid outlet 140. As noted above, other head connection arrangements can be employed to change the function and purpose of the fluid ports 120, 140, 127, 124.

In some embodiments, the fluid lines 123, 125 in the heads 108 are substantially parallel to one another, enabling the assemblies 104, 105 to be disconnected from one another and re-connected in other configurations as will be described in greater detail below. However, in other embodiments, the fluid lines 123, 125 can run in any other manner through the heads 108, and need not necessarily be straight or parallel to one another. In such embodiments however, the assemblies 104, 105 provide good performance results when the fluid lines 123, 125 are fluidly isolated from one another (except through the fluid path defined through the respective fluid treatment cartridges 116). Although only two fluid lines 123, 125 run through each head 108 as described above and shown in the figures, in other embodiments fewer or more fluid lines can be employed as desired, any of which can also be in fluid communication with different locations of the cartridge 116 as desired.

With reference back to the illustrated exemplary embodiment, and with particular reference to FIG. 2A, each of the fluid lines 104, 105 are in fluid communication with their respective cartridges 116. This fluid communication can be established in a number of different manners, such as by an aperture, port, or shunt in each of the fluid lines 104, 105 (e.g., between the ports 120, 140 of the first fluid line 123 and between the ports 127, 124 of the second fluid line 125). In the illustrated exemplary embodiment for example, the first fluid line 123 has a port 128 establishing fluid communication between the first fluid line 123 and the interior of the cartridge 116. Similarly, the second fluid line 125 has a port 132 establishing fluid communication between the second fluid line 125 and the interior of the cartridge 116. The ports 128, 132 can be located anywhere along their respective fluid lines and can be any size desired. Also, although only one port 128, 132 is employed per fluid line 123, 125 in the illustrated exemplary embodiment, either or both fluid lines 123, 125 can have any number of additional ports establishing fluid communication with the interior of the cartridge 116 anywhere along the fluid lines 123, 125. In addition, each port 128, 132 can take any shape desired (including without limitation round, square, oval, slot-shaped, crescent shaped, U or V-shaped, ring-shaped, and the like). By way of example only, the port 132 in the second fluid line 125 of the illustrated embodiment is substantially round, while the port 128 in the first fluid line 123 is substantially U-shaped. Any combination of port shapes can be employed in other embodiments.

In addition to the fact that the ports 128, 132 establishing fluid communication between the fluid lines 123, 125 and the cartridge 116 can be located anywhere along the fluid lines 123, 125, the ports 128, 132 can also have any relationship with one another. By way of example only, the ports 128, 132 can be in a side-by-side relationship, can be on opposite sides of the head 108, and the like. In some embodiments, such as the one illustrated in the figures, one port 132 is at least partially encircled by another 128. This relationship can define ports 128, 132 that are substantially concentric with respect to one another and/or can enable one port 132 to be recessed or received within another 128 while still being fluidly isolated from the other port 128 (except through the fluid path defined through the fluid treatment cartridge 116).

The location, size, and shape of the ports 128, 132 establishing fluid communication between the fluid lines 123, 125 and the cartridge 116 is at least partially determined by the type of cartridge to which the head 108 is connected, and the location, size, and shape of the fluid ports of the cartridge 116. The types of fluid treatment cartridges 116 that can be employed in the present invention are as varied as the manners in which fluid can be treated and the types of fluid that can be treated. Any fluid treatment device can be attached to the head 108 of each module 104, 105. Examples of fluid treatment devices include, without limitation, filters, chemical feeders, water softeners, fluid sensor and monitoring devices, accumulators, fluid carbonation devices, heaters, chillers, distillers, sterilizers (e.g., UV or ozone treatment devices), pumps, valves and valve assemblies (e.g., RPZ devices), and the like. In short, any device employed for treating or processing fluid of any type, or for moving or controlling the flow of fluid can be employed as a cartridge in each module 104, 105.

In the illustrated embodiment, both cartridges 116 shown are filters, and are presented by way of example and discussion only. Such filters can be of any type and can employ any type of filter media, including without limitation carbon filters, hollow fiber filters, ceramic filters, reverse osmosis filters, and filters employing any of the following filter media: bacteriacidal, granular activated carbon, ion exchange resin, sand (e.g., Manganese Greensand), metallic, ceramic, soluble Phosphate, acidulant, pH correcting, pre-coat carbon block (with or without additives), modified carbon block, polyspun pleated string wound media, and the like. Also, filters employing any combination of such filter types and filter medias can be employed as desired.

By virtue of the fact that the type of filter or non-filter cartridge 116 to be connected to the head 108 of each module 104, 105 can have inlet and outlet ports in any number of different locations on the cartridge 116, the corresponding locations of the ports 128, 132 connecting to such cartridge ports can be located anywhere along the fluid lines 123, 125 through the head 108. As discussed above, in some embodiments one of the ports 132 is at least partially surrounded by another 128, and can be concentric with respect to the other port 128. Such a port arrangement can be employed to connect to cartridges 116 having cartridge ports with a similar arrangement. In some cases, such as in many types of filter cartridges 116, the cartridges 116 have a central first port and a second port located at least partially around the central first port. Accordingly, the ports 128, 132 of the head 108 can be similarly arranged in a central location of the fluid lines 123, 125 and between the fluid lines 123, 125 as best shown in FIGS. 1, 2, 4, and 5. Of course, other port arrangements can be employed depending at least partially upon the locations of the ports of the cartridge 116 as discussed above.

Figure 2B:
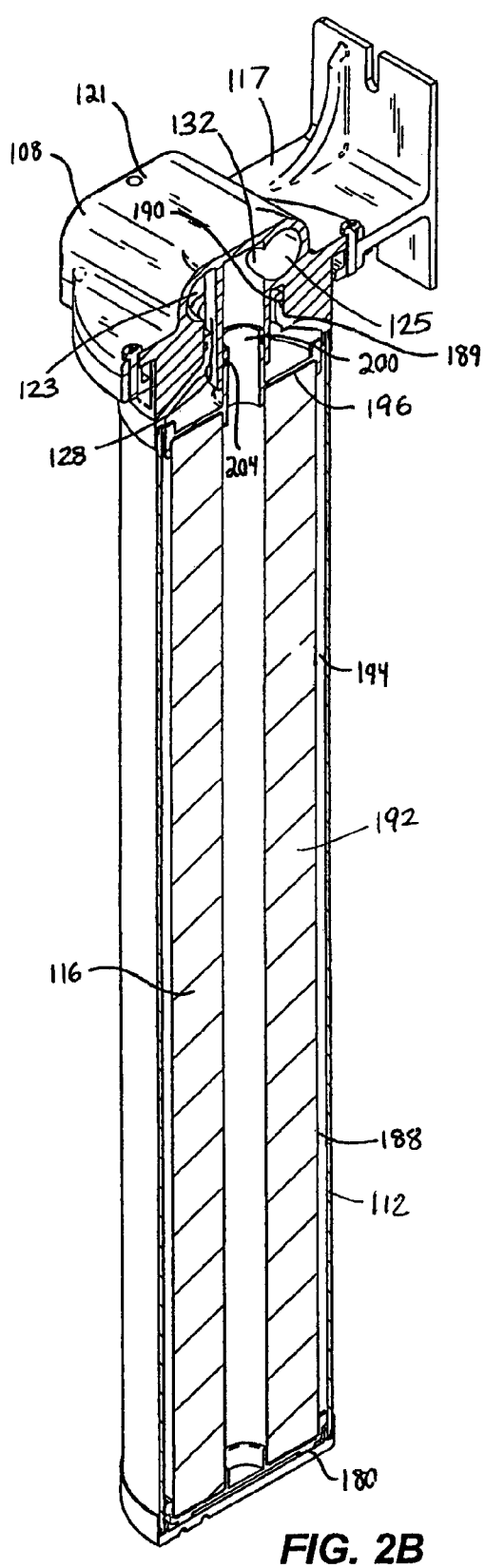
FIG. 2B is a perspective cross-sectional view of the modular fluid treatment system illustrated in FIGS. 1A and 1B, taken along lines 2B-2B of FIG. 1A and shown with the shell removed.

The ports 128, 132 of the head 108 can be defined by apertures in the fluid lines 123, 125 or by the ends of fluid lines running to the cartridge 116. As best shown in FIG. 2B, the ports 128, 132 in the illustrated exemplary embodiment are defined by respective fluid lines running to and connected to ports of the cartridge 116. Either port 128, 132 can be a fluid inlet or a fluid outlet of the head 108 (i.e., a fluid inlet accepting fluid from the cartridge 116 into the head 108 or a fluid outlet through which fluid passed from the head 108 into the cartridge 116) depending upon the direction of fluid flow through the head 108 as discussed above.

In those cases in which multiple assemblies 104, 105 are connected in the same system 100 to process fluid, the assemblies 104, 105 can be connected together in any conventional manner, such as by hose, tubing, pipe, or other conduit secured to the heads 108 of the assemblies 104, 105 in any conventional manner (e.g., barbed, quick-disconnect, threaded, compression, and other fittings). In such cases, the hose, tubing, pipe, or other conduit connects one or more ports 120, 127, 124, 140 of one module 104, 105 to one or more ports 120, 127, 124, 140 of another module 105, 104. However, some embodiments of the present invention employ connectors 136 to perform this function. Such connectors 136 enable a user to releasably fluidly connect one module 104 to another 105.

Figure 3K:
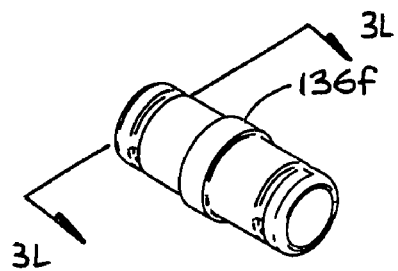
FIG. 3K is a perspective view of a plug according to an embodiment of the present invention.
Figure 3L:
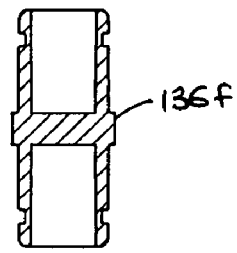
FIG. 3L is a cross-sectional view of the plug illustrated in FIG. 3K, taken along lines 3L-3L of FIG. 3K.
Figure 3M:
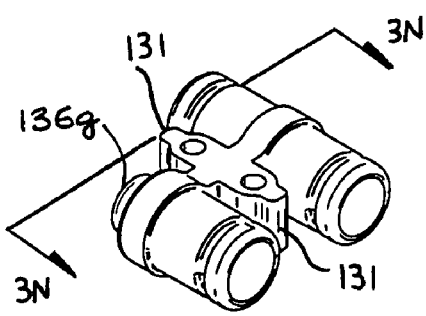
FIG. 3M is a perspective view of another connector according to an embodiment of the present invention.
Figure 3N:
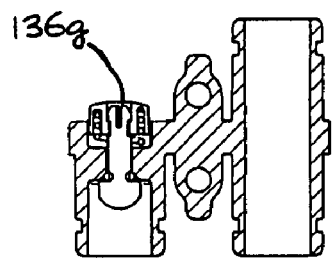
FIG. 3N is a cross-sectional view of the connector illustrated in FIG. 3M, taken along lines 3N-3N of FIG. 3M.
Figure 3O:
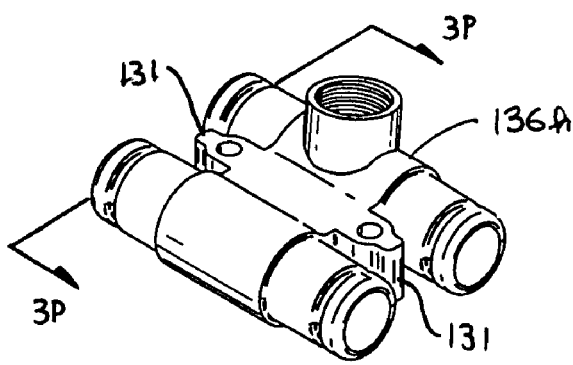
FIG. 3O is a perspective view of another connector according to an embodiment of the present invention.
Figure 3P:
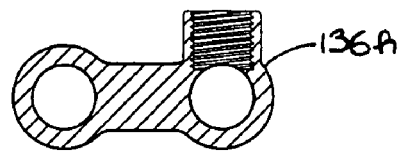
FIG. 3P is a cross-sectional view of the connector illustrated in FIG. 3O, taken along lines 3P-3P of FIG. 3O.

The connectors 136 can take a number of different forms, some of which are shown in FIGS. 3A-3P. One type of connector 136a shown in FIGS. 3A and 3B is generally H-shaped, and connects two ports 124, 140 of one module 104 to two ports 127, 120 of another module 105. In particular, the connector 136a has a body through which two fluid lines pass to establish the fluid connections just described, and/or is defined by two conduits joined in a side-by-side manner. Although both fluid lines need not necessarily be defined in the same body or part (e.g., the ports 124, 140, 127, 120 can be fluidly connected by separate nipples or other conduits), a single connector element 136a can simplify assembly and disassembly while also reducing the number of parts of the system 100. Still other shapes of the connector 136a are possible and fall within the spirit and scope of the present invention. Depending upon the direction of flow through the system 100, the connector 136a can therefore connect two outlet ports 124, 140 of one module 104 to two inlet ports 127, 120 of another module 105, or can connect two inlet ports 124, 140 of one module 104 to two outlet ports 127, 120 of another module 105.

Another type of connector 136b shown in FIGS. 3C and 3D fluidly connects one port 124, 140 of a first module 104 to one port 127, 120 of a second module 105 while plugging another port 140, 124 of the first module 104 or another port 120, 127 of the second module 105. In another embodiment (shown in FIGS. 3E and 3F), a connector 136c can be adapted to fluidly connect two ports while plugging two others (e.g., fluidly connecting port 124 of module 104 to port 127 of module 105 in FIG. 2A, while plugging port 140 of module 104 and port 120 of module 105).

Another type of connector 136d shown in FIGS. 3G and 3H fluidly connects one port 124, 140 of a first module 104 to one port 127, 120 of a second module 105 while permitting a fluid connection to be made between another device and another port 140, 124 of the first module 104 or another port 120, 127 of the second module 105.

Yet another type of connector 136e shown in FIGS. 3I and 3J is adapted to connect a single port 127, 120, 124, 140 of one module 104 to a single port 127, 120, 124, 140 of another module 105 or to another device (not shown).

Each of the types of connectors 136a, 136b, 136c, 136d, 136e can connect to one or more ports 127, 120, 124, 140 of a head 108 in a number of different matters. For example, the illustrated connectors 136a, 136b, 136c, 136d, 136e are dimensioned to be received within ports 127, 120, 124, 140 of the head 108 thorough a clearance fit. Alternatively, the ports 127, 120, 124, 140 can instead be shaped and dimensioned such that the connectors 136a, 136b, 136c, 136d, 136e can receive the ports 127, 120, 124, 140. In either case, gaskets, rings, or seals 129 on the connectors 136a, 136b, 136c, 136d, 136e (e.g., in circumferential grooves on the connectors 136a, 136b, 136c, 136d, 136e) and/or in the fluid lines 123, 125 can be employed to provide a fluid-tight connection between the connectors 136a, 136b, 136c, 136d, 136e and ports 127, 120, 124, and 140. In this regard, any type of conventional gasket, ring, or seal can be employed, and are referred to herein collectively as "seals". Such seals can be integral with the connectors 136a, 136b, 136c, 136d, 136e can be integral with the ports 127, 120, 124, 140, can be elements separate from and connected to the connectors 136a, 136b, 136c, 136d, 136e or can be elements separate from and connected to the ports 127, 120, 124, 140. By way of example only, the seals for the connectors 136a, 136b, 136c, 136d, 136e in the illustrated embodiment are O-rings retained in circumferential grooves in the connectors 136a, 136b, 136c, 136d, 136e as shown.

In other embodiments of the present invention, the connectors 136a, 136b, 136c, 136d, 136e can fluidly connect and/or plug ports 127, 120, 124, 140 as described above using any conventional fluid fitting or style. For example, the connectors 136a, 136b, 136c, 136d, 136e can be retained in connected relationship with the heads 108 by the sealing force of seals as described above, by threaded connections between the connectors 136a, 136b, 136c, 136d, 136e and head 108, by swage, press-fit, or compression-type connections, by quick-disconnect connections, and in any other manner employed to fluidly connect conduits. In this regard, the same connector 136a, 136b, 136c, 136d, 136e can have multiple types of end connections as needed to connect with other assemblies 104, 105 or devices. By way of example only, the system illustrated in FIG. 2A employs three types of connectors 136a, 136b, 136g used to connect ports 120, 124 to other equipment. Each of these connectors 136a, 136b, 136g have O-rings for fluid-tight connections to other assemblies 104, 105 or devices. One connector 136g has a pressure relief valve and a threaded fitting, while another of the connectors 136b has a plug and a threaded fitting. Any combination of fittings employed on the same connector 136a, 136b, 136c, 136d, 136e is possible and falls within the spirit and scope of the present invention.

In some embodiments, the fitting type employed to connect the connectors 136a, 136b, 136c, 136d, 136e to the ports 127, 120, 124, 140 provides resistance to disconnection between the connectors 136a, 136b, 136c, 136d, 136e and the ports 127, 120, 124, 140. However, in some cases where it is desirable to strengthen such connections (or in those embodiments in which such connections are otherwise not sufficiently strong to resist disconnection under normal system use), the connectors can be secured with respect to the head 108 in one or more additional manners. For example, in the illustrated exemplary embodiment, the connectors 136a, 136b, 136c, 136d, 136e are each provided with one or more extensions 131 each adapted to be received within a recess 133 in a head 108 to which the connectors 136a, 136b, 136c, 136d, 136e are connected. In alternative embodiments, the locations of the extensions 131 and recesses 133 can be reversed, if desired. The connection between the extension(s) 131 and recess(es) 133 can be snap-fit or can otherwise be shaped and dimensioned to provide resistance to disconnection of the connector (s) 136a, 136b, 136c, 136d, 136e and the head 108. Additional resistance to disconnection can be provided by one or more fasteners (e.g., screws, bolts, setscrews, pins, and the like) passed through apertures in the head 108 and connectors 136a, 136b, 136c, 136d, 136e as shown in the illustrated embodiment. Still other manners of increasing resistance to disconnection of the head 108 and connector 136a, 136b, 136c, 136d, 136e will be appreciated by one having ordinary skill in the art. It should be noted that any of the types of connectors 136 described herein can employ the extensions 131 as described above (or any of the alternate manners of securing the connectors 136 as also described herein). By way of example only, the connector 136e illustrated in FIGS. 3I and 3J need not necessarily employ the extension as illustrated. As another example, a connector 136f illustrated in FIGS. 3K and 3L (and described below) can employ such an extension, if desired.

Although the connectors 136a, 136b, 136c, 136d, 136e described above and illustrated in the figures are elements that are separate from the heads 108 of the assemblies 104, 105, it should be noted that any one or more of the connectors 136a, 136b, 136c, 136d, 136e can be integral with a head for releasable disconnection to another head 108 in the same manner as the connectors 136a, 136b, 136c, 136d, 136e discussed above.

Still other elements can be connected to the heads 108 of the assemblies 104, 105 to define the path of fluid through the system 100. For example, in some embodiments any of the ports 127, 120, 124, 140 can be plugged by a plug 136f (see FIGS. 3K and 3L). The plug 136f can be fitted to plug into any such port 127, 120, 124, 140 in any manner, including by use of any fitting type described above with reference to the connectors 136a, 136b, 136c, 136d, 136e. As another example, any of the ports 127, 120, 124, 140 can be fitted with a pressure relief fitting (see FIGS. 3M and 3N). The plug 136f and pressure relief fitting 136g can be separate elements or can each be part of a larger connector. Still other types of fittings can be adapted to be attached to any of the ports 127, 120, 124, 140 as desired.

Still other types of connectors 136 can be employed to tap or bleed fluid from any location in a system 100 according to the present invention. Some connector types enable fluid to be taken from the system through an end of a connector 136. For example, the connector 136d illustrated in FIGS. 3G and 3H permits connection of a fluid line to the connector 136d for this purpose. Other types of connectors 136 enable fluid to be tapped or bled from the system in other manners. For example, the connector 136h illustrated in FIGS. 3O and 3P has an internally-threaded fitting located adjacent and in fluid communication with one of the two fluid lines running through the connector 136h. The internally-threaded fitting of the connector in FIGS. 3O-3P extends from a top surface of the head 108, although the fitting can extend in any other direction desired. Also, although this fitting is shown as having internal threads, it should be noted that any other fluid fitting connector can instead be employed, including without limitation externally-threaded fittings, barbed fittings, John Guest® type fittings, and the like.

In some embodiments of the present invention, a fluid treatment system according to the present invention can be assembled on or off-site using a reduced number of system components, such as a number of standard shells 112, heads 108, brackets 117, and a variety of connector types. In such cases for example, an installer or servicer of a system can have a kit of standard connectors that can be employed to connect as many heads as desired in a large number of different configurations to meet the needs of a wide variety of applications. The connectors 136 can include any of the types of connectors 136 illustrated in FIGS. 3A-3P, any of which can be in different sizes, such as connectors 136 having different fitting sizes (e.g., ⅜", ½" and ¾" threaded fittings, differently-sized John Guest fittings, differently-sized barbed fittings, and the like). Accordingly, a field kit of connectors 136 for use in the system can include several different types of connectors in different sizes as needed to assemble one or more heads 108 in any system 100.

As discussed above, the fluid lines 123, 125 extending through the head 108 of each module 104, 105 can be in any orientation and positional relationship with respect to one another. However, in some embodiments advantages are presented by employing fluid lines 123, 125 that are substantially parallel to one another. For example, such embodiments enable the use of connectors 136a, 136b, 136c, 136d, 136g that connect to multiple ports 127, 120, 124, 140 of the same head 108 as described above. Also, such an arrangement enables a user to assemble a system 100 of assemblies 104, 105 in a number of different manners using the same style of head 108 for each module 104, 105. In this regard, it should be noted that this modularity and connectability does not require parallel fluid lines 123, 125 in the head 108 (although such lines are employed in the exemplary illustrated embodiment). Specifically, such modularity and connectability of the present invention is possible by employing heads 108 having standardized positions of the ports 127, 120, 124, 140 on opposite sides of the each head 108 regardless of the shape and paths of the fluid lines 123, 125 within the heads 108.

An example of the modularity provided by the head 108 according to the present invention is best illustrated in FIGS. 1, 2A, 4, and 5. In this embodiment, two assemblies 104, 105 are connected together to treat fluid in parallel (e.g., both assemblies 104, 105 performing the same function upon fluid at the same time, such as for increased fluid treatment capacity or speed). The head of each module 104, 105 has four ports 127, 120, 124, 140. For purposes of discussion, these ports will be referred to as first (120), second (127), third (124), and fourth (140) ports. Fluid passes through the system 100 from left to right (as viewed in FIG. 2A), although fluid can instead pass in a reverse direction through the system 100 as desired. Accordingly, fluid enters the first module 105 via the first (inlet) port 120, and exits the module 105 via the third (outlet) port 124 and the fourth (outlet) port 140. Fluid is prevented from exiting the second port 127 by a pressure relief valve of the connector 136g fitted in the second port 127. Fluid exiting the third (outlet) port 124 of the first module 105 then enters the second module 104 via the second (inlet) port 127 of the second module 104, and fluid exiting the fourth (outlet) fluid port 140 then enters the module 104 at the first (inlet) port 120 of the second module 104. Fluid then exits the second module 104 at the third (outlet) port 124 of the second module 104.

Using the same assemblies 104, 105 and different connectors 136, the system 100 illustrated in FIG. 2A can be changed to process fluid through the assemblies 104, 105 connected in series, such as to process the fluid through two different types of treatment using two different types of cartridges 116. In particular, the assemblies 104, 105 can be disconnected by releasing the fasteners securing the connector 136a from the heads 108, and pulling the connector 136a out from the heads 108 (such as by pulling the assemblies 104, 105 apart). Next, another connector 136c can be installed that establishes fluid communication between the third (outlet) port 124 of the first module 105 and the second (inlet) port 127 of the second module 104 while plugging the fourth port 140 of the first module 105 and the first port 120 of the second module 104. Finally, the plug closing the fourth port 140 of the second module 104 can be moved to plug the third port 124 of the second module 104. In this manner, the system 100 illustrated in FIG. 2A can be easily re-configured as shown in FIG. 4 from a system in which the assemblies 104, 105 are connected in parallel (FIG. 2A) to one in which the assemblies 104, 105 are connected in series (FIG. 4).

In the system re-configuration just described, it should be noted that the flow path through the assemblies 104, 105 is changed from one in which fluid flows into the cartridge 116 of the second module 104 through one port 128 to one in which fluid flows into the cartridge 116 of the second module 104 through another port 132 (i.e., the flow through the cartridge 116 in the second module 104 is effectively reversed). In yet another example of the capabilities of the system 100 according to the present invention, it is possible to re-configure the system 100 again so that fluid flows into both cartridges 116 through the same port (128) in both modules 104, 105 connected in series and out of both cartridges through the same port (132) in both modules 104, 105. Specifically, the head 108 of the second module 104 can be reversed by rotating the head 108 after the heads 108 have been disconnected as described above. Following this rotation, the connector 136c described above can be installed to establish fluid communication between the third (outlet) port 124 of the first module 105 and the fourth (inlet) port 140 of the second module 104 while plugging the fourth port 140 of the first module 105 and the third port 124 of the second module 104. The resulting arrangement is illustrated in FIG. 5, showing a system in which fluid passes through both assemblies 104, 105 in series and also passes into and out of the cartridges 116 through similar ports.

Figure 6:
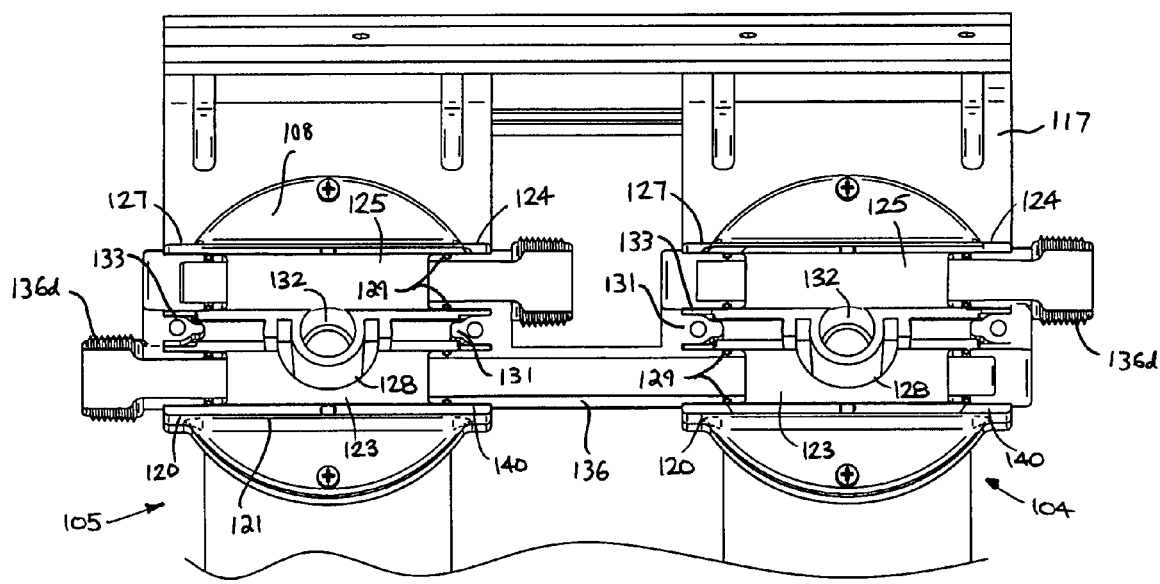
FIG. 6 is a perspective cross-sectional view of part of the modular fluid treatment system illustrated in FIGS. 1A and 1B, shown in yet another arrangement.

FIG. 6 illustrates yet another example of the various manners in which the system 100 can be configured by virtue of the modular nature of the assemblies 104, 105. In this embodiment, fluid passing through the system is processed in both assemblies 104, 105 (whether identical or different) simultaneously for producing treated fluid that can be routed to different locations and/or used for different purposes. In this exemplary embodiment, the fourth port 140 of the first module 105 can be releasably connected to the first port 120 of the second module 104 using a connector 136c, while the second port 127 of the second module 104 is plugged by the connector 136c. This configuration thus allows fluid received at the first port 120 of the first module 105 to also be received at the first port 120 of the second module 104.

As discussed above, the heads 108 according to the present invention can be oriented and connected in a number of different manners, enabled at least in part by the rotatability of the heads 108 with respect to one another and the ability to connect the ports 120, 127, 124, 140 of the heads 108 in a number of different manners using a relatively small number of different connectors 136. This modularity enables a system 100 having any number of the same or different assemblies 104, 105 to be configured in a large number of manners to meet the particular needs of the user. In addition, this modularity also enables a user to define a large number of flow paths through the system using a common head 108 and a relatively small number of parts. Examples of the types of paths that can be created include in-series flow paths, parallel flow paths, and combinations of such paths through the system 100.

The ability to connect fluid treatment modules 104, 105 having the same or similar structure in different configurations as described above provides additional advantages in a fluid treatment system 100. In many cases, the heads 108 of such fluid treatment modules 104, 105 can be rearranged with respect to one another without significantly disturbing other portions of the system 100. For example, in the illustrated exemplary embodiments, the system 100 can be changed by simply pulling apart adjacent fluid treatment modules 104, 105 (in some cases, while still on the same rail or bracket), changing the type of connector 136 between the modules 104, 105 and/or rotating the head 108 of either or both fluid treatment modules 104, 105 by 180 degrees, and then re-connecting the fluid treatment modules 104, 105 with the connector 136. This process can be employed to easily add a new module 104, 105 to the system 100, remove a module 104, 105 from the system, change between parallel and series flow of modules 104, 105, add or remove components in the system (e.g., pressure relief valves, bleed lines introduced by replacing one type of connector 136 with another connector having a fitting for bleeding fluid from the system 100, and the like), system re-configurations, and the like.

Also, in some embodiments the standard head shape of the modules 104, 105 provides improved system modularity compared to conventional systems. For example, the ports 120, 127, 124, 140 of the each head 108 in the illustrated exemplary embodiments are located in the same positions on each head 108, and permit connection to adjacent modules 104, 105 in at least two rotational positions of the heads 108 as described above). Although the different rotational positions are 180 degrees apart in the illustrated exemplary embodiments, these positions can be separated by any other rotational amount (e.g., 90 degrees, 45 degrees, 60 degrees, and the like). By employing ports located as described above and illustrated in the figures, the location of fluid treatment modules 104, 105 in a system 100 can remain substantially undisturbed in some embodiments. Specifically, the modules 104, 105 in a system 100 can have different configurations (e.g., wherein one or more of the heads 108 are rotated in different configurations and/or are connected in different manners to adjacent heads 108), while still being in the same locations with respect to other modules and the environment surrounding the system 100. For example, the changes made to the configuration of the fluid treatment system 100 of FIG. 2A to result in the configuration illustrated in FIG. 5 include changing the types of connectors employed in the modules 104, 105 and rotating one module 104 to a new position with respect to another module 105. However, the locations of both modules 104, 105 with respect to any other modules (not shown) and any surrounding pipes, equipment, fixtures, and other elements are the same in both configurations. Additional plumbing and other fixtures need not be removed or installed in order to change between configurations by virtue (at least in part) upon the common module and port locations in both configurations.

In summary, although one or more heads 108 can be rotated in changing the configuration of the system 100, the locations at which ports 120, 127, 124, 140 are positioned (for connection or otherwise) can be the same in different system configurations. Also, the modules 104, 105 can occupy the same locations in a system 100 despite being in different configurations (rather than requiring additional plumbing and/or fixtures to connect modules 104, 105 that have been re-configured by rotation and re-connection as described above). This increased modularity can be achieved in some embodiments by employing module heads 108 having two or more rotational positions in which different fluid ports 120, 127, 124, 140 occupy the same locations in the different rotational positions of the module heads 108.

Figure 2C:
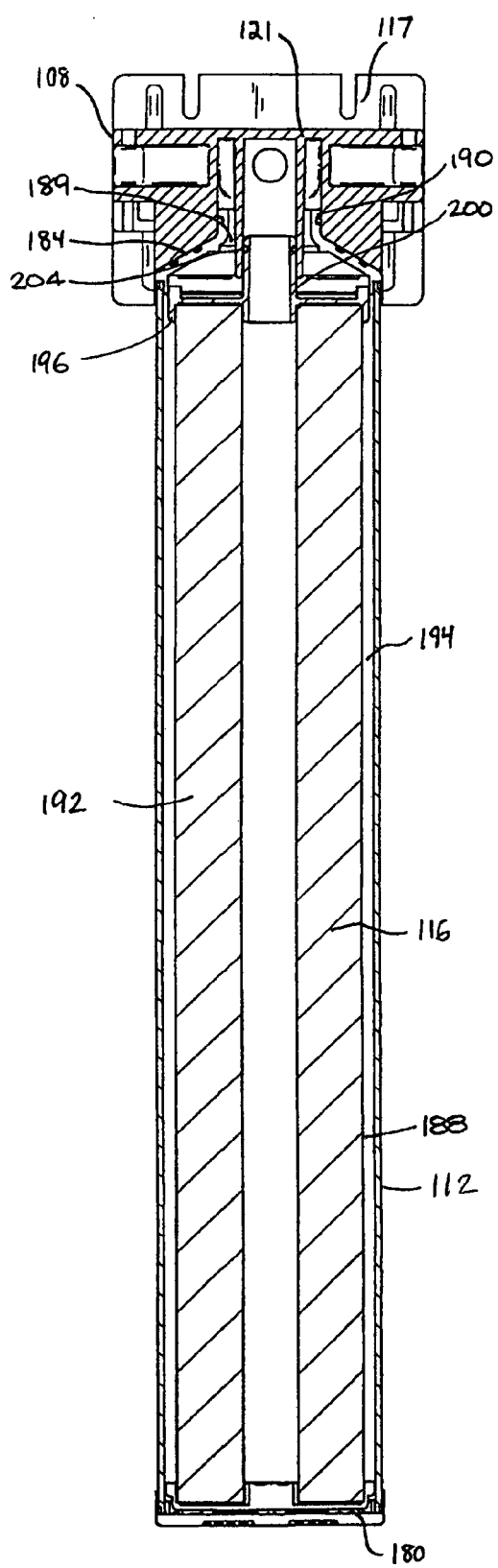
FIG. 2C is a cross-sectional view of part of the modular fluid treatment system illustrated in FIGS. 1A and 1B, taken along lines 2C-2C of FIG. 1A and shown with the shell removed.

As discussed above, the head 108 of each illustrated module 104, 105 has ports 128, 132 establishing fluid communication between the head 108 and the cartridge 116. With reference to FIGS. 2B and 2C, this manner of connection is shown in greater detail with respect to a filter cartridge 116 by way of example only. The cartridge 116 has first and second ports 189, 200 connectable to the ports 128, 132 of the head 108. The ports 189, 200 can be any shape and size and can be located in any position on the cartridge 116 suitable for connection to the ports 128, 132 of the head 108 (or to fluid lines extending toward the cartridge 116 from the ports 128, 132 of the head 108). In this regard, the ports 128, 132 need not necessarily be concentric as shown, and need not necessarily be centrally located with respect to an end of the cartridge 116.

Figure 8:
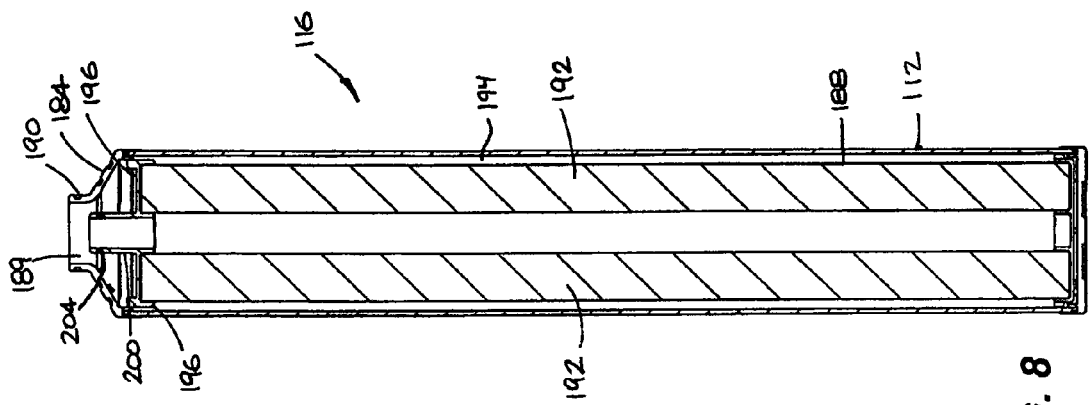
FIG. 8 is a elevational cross-sectional view of a module employed in the system illustrated in FIGS. 1-6, taken along lines 8-8 of FIG. 1A.
Figure 7:
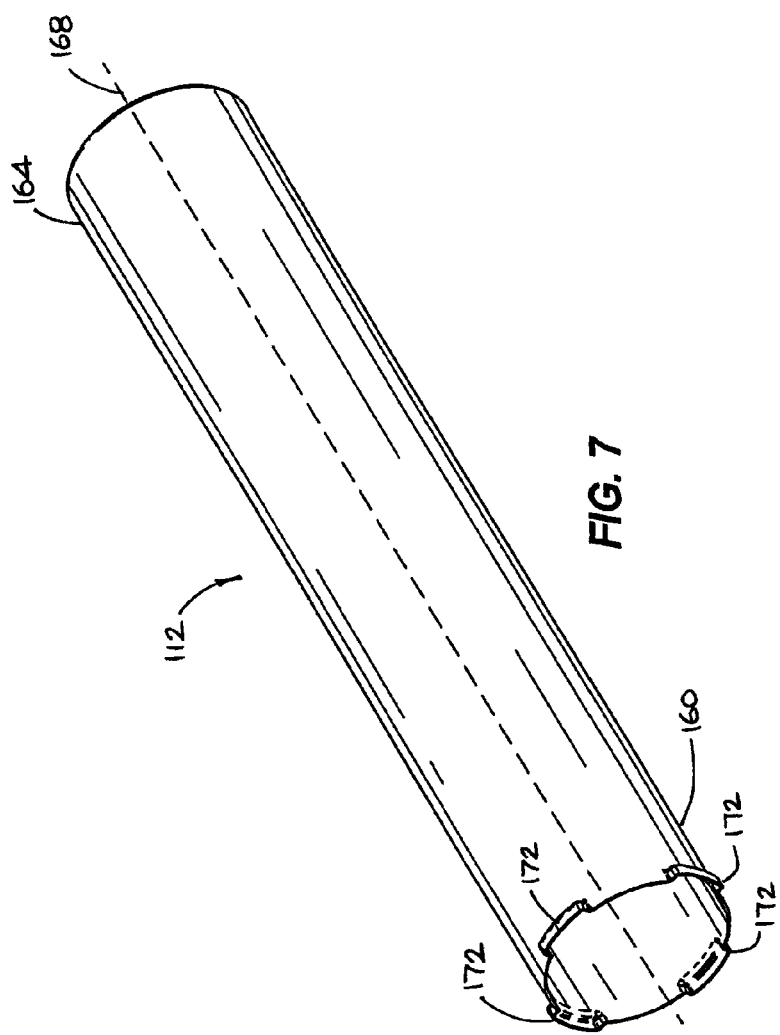
FIG. 7 is a perspective view of a shell of a module employed in the system illustrated in FIGS. 1-6.

The ports 189, 200 of the cartridge 116 illustrated in FIG. 8 are axially offset with respect to one another for releasable connection to the ports 128, 132 of the head 108, although any other axial relationship of the cartridge ports 189, 200 can be employed as desired or for connection to heads 108 having other configurations. Each port 189, 200 of the cartridge 116 is provided with a gasket, ring, or seal (herein referred to collectively as "seals") 190, 204 to establish a fluid-tight connection with a corresponding port 128, 132 of the head 108 for purposes that will be described in greater detail below. In some embodiments, seals 190, 204 can instead be provided on the ports 128, 132 of the head 108. The seals 190, 204 can be integral with or connected to the ports 189, 200 of the cartridge 116 or the ports 128, 132 of the head 108. In the illustrated exemplary embodiment, the seals take the form of O-rings fitted upon the cartridge ports 189, 200 and recessed within grooves as shown to establish the above-described fluid connections.

The cartridge 116 can take a number of different shapes, and in the illustrated embodiment is substantially elongated with a round cross-sectional shape. The structure of the cartridge 116 can vary significantly from type of cartridge to type of cartridge. However, many types of cartridges 116 have a housing defined at least in part by a cap 184 and a bottle 188 (defining a top, side walls, and a bottom of a housing of the cartridge 116). By way of example only, the cartridge 116 of the illustrated exemplary embodiment best illustrated in FIG. 8 is a filter cartridge having a filter medium 192 positioned in an internal chamber 194 of the filter bottle 188. In some embodiments, the filter medium 192 can be capped by a channeling cap 196 requiring fluid to flow around the cap 196 and through the filter medium 192 in a manner well-known in the art. The channeling cap 196 can also define or include one of the ports 200 of the cartridge 116 described above.

In those embodiments of the cartridge 116 having a cap 184 and a bottle 188 as described above, the cap 184 can be permanently secured to the bottle 188 in a number of different manners, such as by spin-welding, ultrasonic-welding, adhesive or cohesive bonding material, and the like. However, in other embodiments the cartridge 116 can have a removable cap 184 to provide access and/or removal and installation of one or more internal elements (e.g., a filter element, components of another module type, and the like). Accordingly, the cap 184 can be connected to the bottle 188 by a threaded connection, by one or more bolts, screws, clips, pins, snap-fit or other inter-engaging elements, clamps, buckles, or other conventional fasteners, and the like.

Although not required in all of the various embodiments of the present invention, some embodiments employ a shell 112 that receives the cartridge 116. The shell 112 can be made of any material. However, advantages are provided by employing a shell 112 made of a relatively strong and rigid material resistant to bending or deforming, such as aluminum, steel, stainless steel, fiberglass and other composites, and the like. In particular, by employing a shell 112 constructed of substantially rigid material as just described, the housing 184, 188 of the cartridge 116 (described above) can be constructed of relatively thin and/or weak material (such as plastic) that would otherwise be deformable and/or unable to withstand the operational pressures of fluid within the module 104, 105. Therefore, the shell 112 can be employed as a non-disposable component of the module 104, 105 while the cartridge 116 can be entirely disposable and can be constructed of lower-cost materials in order to reduce the overall cost of the cartridge 116.

In addition, in those embodiments employing a seal between a wall of the head 108 (defining a port 128, 132 of the head 108) and a wall of the cartridge 116 (defining a port 189, 200 of the cartridge 116), the use of a deformable cartridge housing 184, 188 as just described can provide improved fluid-tight connections. For example, with increasing fluid pressure inside the cartridge 116 illustrated in FIG. 8, the housing 184, 188 of the cartridge 116 expands radially outwardly. In some embodiments, this expansion produces compression upon the seals 190, 204 between the cartridge and housing ports 189, 200, 128, 132, thereby producing an improved fluid-tight connection during operation of the fluid treatment system 100 and with increased internal pressure within the cartridge 116.

As described above, the use of a deformable housing material for the cartridge 116 can enable the cartridge housing 184, 188 to expand when sufficiently pressurized (e.g., during operation of the fluid treatment system 100). In some embodiments, this expansion is substantially radially, whereby the bottle 188 of the cartridge 116 presses against and is contained by the shell 112. This expansion and resulting pressure can be localized in one or more areas of the cartridge 116 or can be distributed over any portion of the housing bottle 188. In some embodiments, the bottle 118 of the cartridge 116 radially expands along at least a majority of an elongated length thereof. Therefore, pressure of the cartridge 116 against the shell 112 is along at least a majority of the length of the shell 112. In other embodiments, the bottle 118 of the cartridge 116 radially expands along substantially all of an elongated length thereof. Therefore, pressure of the cartridge 116 against the shell 112 is along substantially the entire length of the shell 112. This type of expansion stands in contrast to some existing cartridges that expand along the longitudinal axis of the cartridge. In this regard, the bottle 188 of the cartridge in some embodiments of the present invention has substantially uniform properties along the length thereof (e.g., substantially uniform material properties of the bottle 188, substantially uniform wall thickness of the bottle 188, and substantially uniform radial, circumferential, and axial wall strengths of the bottle 188 along the length of the bottle 188). In some embodiments, such uniformity of the bottle properties can be obtained by manufacturing the bottle 188 from tube stock of a large number of materials.

A shell 112 according to an exemplary embodiment of the present invention is illustrated in FIG. 7-9C. In this embodiment, the shell 112 is a tube having two open ends 160, 164 and a longitudinal axis 168. The first open end 160 has a plurality of flanges 172 projecting outwardly from the shell 112, while the second open end 164 has an inwardly-disposed edge or lip 176. As an alternative to the inwardly-disposed edge or lip 176, the shell 112 can have a closed second end 164 or a second end 164 having one or more members positioned to block the passage of a plug cap 180 through the second end 164. The plug cap 180 (used in some embodiments of the present invention) provides a base upon which the cartridge 116 can be seated.

The plug cap 180 (if employed) can be a disc or other substantially flat element made of metal, plastic, composites, or any other suitable material for retaining a cartridge 116 within the shell 112 by blocking the second end of the shell 112. However, the plug cap 180 can take any other shape capable of performing this function.

In some embodiments, the shape of the plug cap 180 is selected to prevent some types of cartridges 116 from being properly positioned within the shell 112. For example, if a cartridge 116 is not fully received within a shell 112 due to the shape of the plug cap 180, in many cases the length of the cartridge 116 will block proper connection of the shell 112 to the bracket 117 or head 108 as described above. As another example, if a cartridge 116 is received too far within a shell 112 due to the shape of the plug cap 180, in many cases the cartridge 116 in the shell 112 will not reach the head 108 for connection thereto, or an unacceptable gap will exist between the plug cap 180 and the cartridge 116 (if the cartridge 116 is first connected to the head 108 after which time the shell 112 is placed over the cartridge 116). As yet another example, if a cartridge 116 is received in an incorrect rotational orientation with respect to the shell 112 due to the shape of the plug cap 180, in many cases the ports 189, 200 of the cartridge 116 will not be properly aligned with the ports 128, 132 of the head 108 for connection thereto. In such cases, the plug cap 180 can be shaped to inter-engage the shell 112 in one or more rotational positions of the plug cap 180 with respect to the shell 112 as will be described in greater detail below.

Accordingly, the plug cap 180 can be shaped to permit only properly shaped cartridges 116 to be received within the shell 112 while still enabling connection of the shell 112 to the bracket 117 (or head 108) and proper connection of the cartridge 116 to the head 108. This relationship between the plug cap 180 and selected cartridges 116 can be employed to ensure that incorrect or inferior types of cartridges 116 cannot be employed with certain plug caps 180 (and therefore, certain shells 112), thereby reducing or eliminating the use of inferior or incorrect cartridges in the system 100, in the wrong shells 112, or with the wrong heads 108.

Two plug caps 180 according to different exemplary embodiments of the present invention are illustrated in FIGS. 10A-10D. Each plug cap 180 is round and substantially flat (although other plug cap shapes can be employed as desired). In some embodiments, the plug caps 180 have one or more apertures 181 at least partially therethrough to permit air to escape from within a shell 112 when the shell 112 is installed on the cartridge 116 and/or to permit air to enter the shell 112 when the shell 112 is removed from the cartridge 116.

Figure 10A:
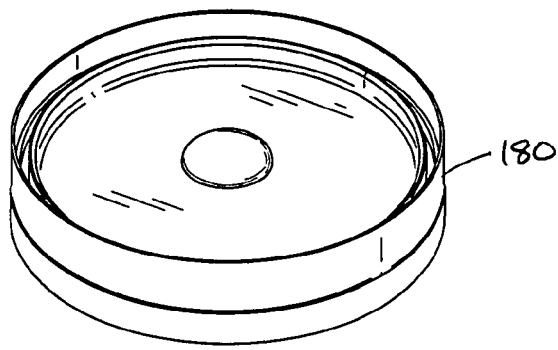
FIG. 10A is a top perspective view of a plug cap according to an embodiment of the present invention.
Figure 10B:
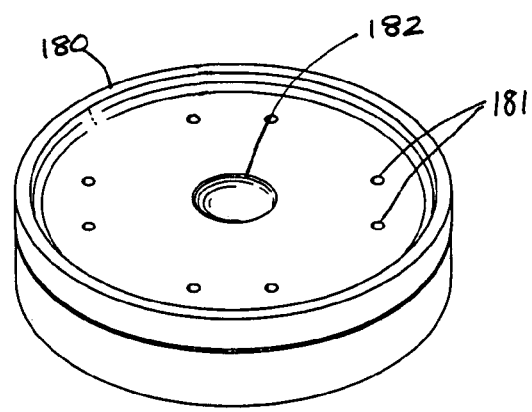
FIG. 10B is a bottom perspective view of the plug cap illustrated in FIG. 10A.
Figure 10C:
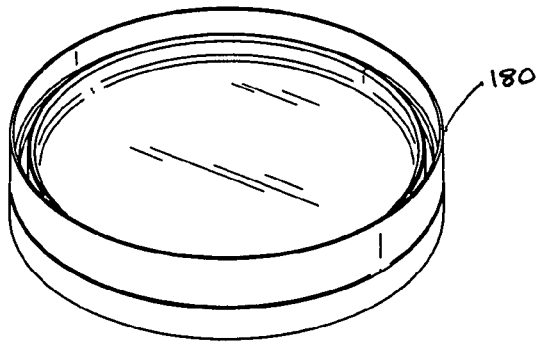
FIG. 10C is a top perspective view of a plug cap according to another embodiment of the present invention.
Figure 10D:
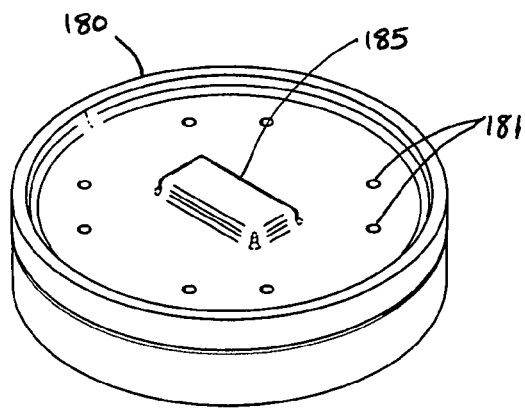
FIG. 10D is a bottom perspective view of the plug cap illustrated in FIG. 10C.

The plug cap 180 illustrated in FIGS. 10A and 10B has rounded recess 182 on one side thereof, while the plug cap 180 illustrated in FIGS. 10C and 10D has a protuberance in the shape of a generally rectangular boss 185. Both the recess 182 and the rectangular boss 185 are centrally located on the plug caps 180, although such features can be located in any other position on the surface of the plug cap 180. Also, although the recess 182 in FIGS. 10A and 10B is rounded and the protuberance 185 in FIGS. 10C and 10D is generally rectangular, both features can have any other shape desired, such as rectangular or irregularly-shaped recesses, round or irregularly-shaped protuberances, and the like.

When installed in a shell 112 as described above, the recess 182 of the plug cap 180 in the illustrated exemplary embodiment of FIGS. 10A and 10B can face into the shell 112 and can receive a protuberance (in some cases, a similarly-shaped protuberance) on a cartridge 116 received within the shell 112. Accordingly, cartridges 116 adapted for the system 100 can have a protuberance shaped and positioned on the end of the cartridge 116 to be received by the recess 182, but will not fit into shells 112 having no such recess 182. Similarly, when the plug cap 180 illustrated in FIGS. 10C and 10D is installed in a shell 112, the protuberance 185 of the plug cap 180 can face into the shell 112 and can be received within a recess (in some cases, a similarly-shaped recess) on a cartridge 116 received within the shell 112. Accordingly, cartridges 116 not having such a recess cannot be fully inserted into the shell 116. Both types of plug caps 180 are examples of how the plug caps 180 can be shaped to permit only certain types of cartridges 116 to be received within the shell 112 for connection to a head 108, or can receive cartridges 116 that are not shaped to be received within other shells 112 (with other plug caps 180) for connection to a head 108.

It will be appreciated that any type and number of recesses, protuberances, and combinations of recesses and protuberances can be employed on different plug caps 180 to define any number of different assemblies in which certain cartridges 116 can be properly installed while others cannot. Such recesses and protuberances can be positioned in any manner desired, such as different circumferential and radial positions on the plug cap 180. In some embodiments, the plug cap 180 can be adapted to seat within the shell 112 in one or more selected rotational positions of the plug cap 180. By way of example only, the plug cap 180 can have one or more projections or recesses on a bottom surface or peripheral edge thereof that mate with one or more recesses or fingers, respectively of the shell 112. In this manner, the plug cap 180 can have a single rotational position or any number of discrete rotational positions with respect to the shell 112. In such embodiments, the protuberance(s) and/or recess(es) on the plug cap 180 as described above can ensure that a cartridge 116 has one or more proper rotational position with respect to the shell 112. By employing flanges 172 or other bracket or head engagement elements of the shell 112 (described in greater detail below) in selected circumferential positions on the shell 112, the protuberance(s) and/or recess(es) on the plug cap 180 can therefore ensure that the cartridge 116 is installed in a selected rotational orientation with respect to the head 108.

Referring back to FIG. 1, the shell 112 of each module 104, 105 can be releasably connected to a respective bracket 117 in a number of different manners, such as by a threaded connection between the end of the shell 112 adjacent the bracket 117 and a series of threads on bracket 117, by a snap-fit connection between the shell 112 and bracket 117, by one or more conventional fasteners such as screws, bolts, clips, clamps, pins, and the like connecting the shell 112 and bracket 117, or by one or more inter-engaging elements as shown in the figures. In particular, the shell 112 in the illustrated exemplary embodiment is provided with flanges 172 (mentioned above) that mate with the bracket 117. The flanges 172 of the shell 112 illustrated in the figures can be formed in any conventional manner, such as by rolling, stamping, machining, and the like. With reference also to FIG. 9D, the flanges 172 and the end of the shell 112 can be inserted in the bracket 117 and can then be turned to secure the shell 112 to the bracket 117.

One having ordinary skill in the art will appreciate that any number of flanges 172 having the same or different shapes can be employed to perform the same function (described above) as the illustrated flanges 172. However, in some embodiments at least three flanges are employed for connecting the shell 112 to the bracket 117 (or to the head 108 as described below). In such embodiments, the flanges 172 can be substantially equally spaced about the circumference of the shell 112, thereby more evenly distributing stress upon the bracket 117. In other embodiments, the flanges 172 can be unequally spaced as desired. In either case, the flanges 172 can be spaced apart and/or shaped so that the shell 112 can be connected to the bracket 117 in only one orientation or a limited number of orientations. By way of example only, the flanges 172 can be spaced so that they mate with recesses in the bracket 117 in only one or two relative orientations of the shell 112 and bracket 117. With reference to FIG. 9D, once the flanges 172 are properly oriented and inserted within the bracket 117, the shell 112 can be rotated to secure the flanges 172 (and the shell 112) within the bracket 117. As another example, one or more flanges 172 on the shell 112 can have different shapes (e.g., longer or shorter, wider or thinner, and the like) than other flanges 172 on the shell 112, and can therefore be adapted to mate with and engage only some of the corresponding recesses in the bracket 117. In this manner, the shell 112 can again be adapted to be connected to the bracket 117 in only one or more selected orientations.

In some embodiments, the shell 112 has at least three equally-spaced flanges 172 as described above. For example, in the illustrated exemplary embodiments, the shell 112 has four equally-spaced flanges 172 for mating in corresponding recesses in the bracket 172. It will be appreciated that the flanges 172 and recesses on the shell 112 and bracket 172 can be reversed, if desired, and that any combination of inter-engaging elements can be employed to secure the shell 112 as described above.

Also, some embodiments of the present invention employ two or more different types of shells 112 having different types of flanges 172 (e.g., spacings and/or sizes of flanges 172) or other inter-engaging elements to releasably connect the shell 112 to the bracket 117. In this manner, the bracket 117 can be adapted to connect to less than all the different types of available shells 112 or even to a single type of shell 112 in order to ensure that incorrect or inferior types of shells 112 are not connected to the bracket 117 (in those embodiments having different types of shells 112 used for housing different types of cartridges 116).

Although the shell 112 illustrated in the figures is adapted to be releasably attached to the bracket 117 as described above, the shell 112 can instead or in addition be releasably mounted to the head 108 in any of the manners described above with reference to the bracket and shell connection.

In some types of cartridges, fluid can move through the cartridge 116 in either direction (e.g., from the head 108 into the cartridge 116 through the port 132 in the head 108 or from the cartridge 116 into the head 108 through the port 132 in the head 108). Accordingly, and with reference to the exemplary cartridge 116 illustrated in FIG. 8, fluid can flow through the port 132 in the head 108, into the cartridge 116 through a first cartridge port 200, through the filter media 192, and out of the second cartridge port 189 and port 128 in the head 108, or can flow in an opposite direction through the port 128 in the head 108, into the cartridge 116 through the second cartridge port 189, through the filter media 192, and out of the first cartridge port 200 and port 132 in the head 108.

In some embodiments, the connections between the cartridge ports 189, 200 and the ports 128, 132 in the head 108 are fluid-tight (provided in some embodiments by seals 190, 204 as described above). This fluid-tight relationship and the relationship of the ports 189, 200, 128, 132 of the assemblies 104, 105 described above can provide advantages over conventional fluid treatment modules. In particular, the fluid-tight connections between the ports 189, 128, 200, 132 as described above provide an assembly in which fluid entering or exiting the cartridge 116 does not enter between the exterior 108 of the cartridge 116 and the interior 212 of the shell 112. Accordingly, fluid is retained within the cartridge 116 and the head 108, resulting in a cleaner and more sanitary fluid treatment system than conventional systems.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. A fluid treatment assembly comprising:
    a head having a fluid inlet configured to receive fluid into the assembly, and a fluid outlet through which fluid exits the assembly;
    a shell releasably coupled to the head at a first end, having a shell interior, the shell including a plug cap located at a second end opposite the first end, the plug cap being removable from the second end of the shell, the plug cap including one of a recess and a protuberance; and
    a cartridge removably received within the shell and releasably coupled to the head, the cartridge shaped to engage the one of the recess and the protuberance of the plug cap when in at least one rotational position within the shell in order to prevent use of an incorrect cartridge, the cartridge having a cartridge wall separating an interior of the cartridge from an exterior of the cartridge, the cartridge wall having substantially uniform properties along the cartridge and between opposite ends of the cartridge and deformable under internal fluid pressure to radially expand against the shell;
    a cartridge inlet configured to receive fluid from the head;
    a cartridge outlet through which fluid exits the cartridge to the head; and
    an internal chamber through which fluid passes from the cartridge inlet to the cartridge outlet, the cartridge configured to retain fluid within the internal chamber and the head and to fluidly isolate the shell interior and the cartridge exterior from fluid passing through the fluid treatment assembly.

2. The assembly of claim 1, wherein the head further comprises a second fluid outlet and a second fluid inlet releasably coupled to the cartridge inlet and cartridge outlet, respectively.

3. The assembly of claim 2, wherein the first cartridge connection includes a first seal, the first seal preventing fluid passing from the second fluid outlet of the head to the cartridge inlet from entering between the shell interior and the cartridge exterior.

4. The assembly of claim 2, wherein the second cartridge connection includes a second seal, the second seal preventing fluid passing from the cartridge outlet to the second fluid inlet of the head from entering between the shell interior and the cartridge exterior.

5. The assembly of claim 3, wherein the second cartridge connection includes the second seal, the second seal preventing fluid passing from the cartridge outlet to the second fluid inlet of the head from entering between the shell interior and the cartridge exterior.

6. The assembly of claim 1, wherein the cartridge inlet and the cartridge outlet are substantially concentric.

7. The assembly of claim 1, wherein the cartridge further comprises a cap about which fluid passes through the cartridge.

\* \* \* \* \*